United States Patent
Kim et al.

(10) Patent No.: US 7,630,832 B2
(45) Date of Patent: Dec. 8, 2009

(54) GUIDING A DRIVE PATH OF A MOVING OBJECT IN A NAVIGATION SYSTEM

(75) Inventors: Myung Hyun Kim, Seongnam-si (KR); Young In Kim, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 11/276,170

(22) Filed: Feb. 16, 2006

(65) Prior Publication Data

US 2006/0195258 A1   Aug. 31, 2006

(30) Foreign Application Priority Data

Feb. 16, 2005   (KR) .................. 10-2005-0012859

(51) Int. Cl.
  *G01C 21/00* (2006.01)
  *G08G 1/123* (2006.01)
  *G06F 17/00* (2006.01)
(52) U.S. Cl. .............. 701/211; 701/216; 340/995.2; 340/995.27
(58) Field of Classification Search ............ 701/1, 701/36, 200, 206, 207, 208, 209, 211, 213, 701/216, 217; 340/988, 990, 995.1, 995.14, 340/995.17, 995.19, 995.2, 995.27
  See application file for complete search history.

(56) References Cited

U.S. PATENT DOCUMENTS

| | | | | |
|---|---|---|---|---|
| 5,003,306 A * | 3/1991 | Takahashi et al. | ...... | 340/995.22 |
| 5,206,811 A * | 4/1993 | Itoh et al. | ...... | 701/211 |
| 5,390,122 A * | 2/1995 | Michaels et al. | ...... | 701/200 |
| 5,410,486 A * | 4/1995 | Kishi et al. | ...... | 701/211 |
| 5,430,655 A * | 7/1995 | Adachi | ...... | 701/209 |
| 5,512,904 A * | 4/1996 | Bennett | ...... | 342/357.14 |
| 5,525,998 A * | 6/1996 | Geier | ...... | 342/357.14 |
| 5,627,547 A * | 5/1997 | Ramaswamy et al. | ...... | 342/357.08 |
| 5,684,940 A * | 11/1997 | Freeman et al. | ...... | 345/630 |
| 5,736,941 A * | 4/1998 | Schulte et al. | ...... | 340/995.2 |
| 5,739,772 A * | 4/1998 | Nanba et al. | ...... | 340/990 |
| 5,839,087 A * | 11/1998 | Sato | ...... | 701/207 |
| 5,874,905 A * | 2/1999 | Nanba et al. | ...... | 340/995.2 |
| 5,949,375 A * | 9/1999 | Ishiguro et al. | ...... | 342/457 |
| 6,018,697 A * | 1/2000 | Morimoto et al. | ...... | 701/209 |
| 6,035,253 A * | 3/2000 | Hayashi et al. | ...... | 701/211 |
| 6,212,471 B1 * | 4/2001 | Stiles et al. | ...... | 701/207 |
| 6,269,304 B1 * | 7/2001 | Kaji et al. | ...... | 701/209 |
| 6,405,107 B1 * | 6/2002 | Derman | ...... | 701/3 |
| 6,446,000 B2 * | 9/2002 | Shimabara | ...... | 701/209 |

(Continued)

*Primary Examiner*—Edward Pipala
(74) *Attorney, Agent, or Firm*—Fish & Richardson P.C.

(57) ABSTRACT

A navigation system, and a method for guiding a moving object having the navigation system, include a control unit which determines a current position of the moving object and whether the moving object has arrived at a guide point of a guide target. The control unit provides the drive path based on the current position of the moving object. Upon arrival of the moving object at the guide point, a first turn guide icon and a second turn guide icon are determined for the guide target, wherein the first turn guide icon and the second turn guide icon collectively represent suggested vehicle operations at the guide point and a drive direction at a position of the guide target from a plurality of previously stored turn guide icons. The guide icons are sequentially displayed relative to the drive path throughout the vehicle operation at the guide point.

26 Claims, 6 Drawing Sheets

U.S. PATENT DOCUMENTS

| | | | |
|---|---|---|---|
| 6,505,117 B1* | 1/2003 | Ratert et al. | 701/209 |
| 6,597,986 B2* | 7/2003 | Mikame | 701/211 |
| 6,611,753 B1* | 8/2003 | Millington | 701/209 |
| 6,771,189 B2* | 8/2004 | Yokota | 340/990 |
| 6,842,694 B2* | 1/2005 | Irie | 701/208 |
| 7,054,745 B1* | 5/2006 | Couckuyt et al. | 701/211 |
| 2001/0013837 A1* | 8/2001 | Yamashita et al. | 340/988 |
| 2001/0027377 A1* | 10/2001 | Shimabara | 701/209 |
| 2001/0037176 A1* | 11/2001 | Mikame | 701/211 |
| 2001/0056326 A1* | 12/2001 | Kimura | 701/208 |
| 2002/0013659 A1* | 1/2002 | Kusama | 701/211 |
| 2002/0014979 A1* | 2/2002 | Wilson | 340/995 |
| 2002/0040271 A1* | 4/2002 | Park et al. | 701/209 |
| 2003/0033080 A1* | 2/2003 | Monde et al. | 701/201 |
| 2003/0074131 A1* | 4/2003 | Barkowski et al. | 701/200 |
| 2003/0132860 A1* | 7/2003 | Feyereisen et al. | 340/973 |
| 2004/0012505 A1* | 1/2004 | Yokota | 340/995.1 |
| 2004/0153242 A1* | 8/2004 | Irie | 701/211 |
| 2004/0186663 A1* | 9/2004 | Irie | 701/211 |
| 2004/0204831 A1* | 10/2004 | Pochuev et al. | 701/207 |
| 2005/0004753 A1* | 1/2005 | Weiland et al. | 701/208 |
| 2005/0027444 A1* | 2/2005 | Kim | 701/208 |
| 2005/0085996 A1* | 4/2005 | Park et al. | 701/208 |
| 2005/0104745 A1* | 5/2005 | Bachelder et al. | 340/906 |
| 2005/0171688 A1* | 8/2005 | Fujita et al. | 701/201 |
| 2005/0256638 A1* | 11/2005 | Takahashi et al. | 701/209 |
| 2005/0261831 A1* | 11/2005 | Irie | 701/211 |
| 2006/0085128 A1* | 4/2006 | Grafe et al. | 701/213 |

* cited by examiner

GUIDING A DRIVE PATH OF A MOVING OBJECT IN A NAVIGATION SYSTEM

CROSS REFERENCE TO RELATED APPLICATIONS

This application claims priority under 35 U.S.C. § 119 to Korean Patent Application No. P2005-12859, filed on Feb. 16, 2005, the entirety of which is hereby incorporated by reference.

BACKGROUND

This description relates to a navigation system and a method of guiding a moving object through a drive path within the navigation system.

As the number of various moving objects, such as automotive vehicles and the like, have increased on roads and highways, traffic congestion and other stresses on infrastructure have also increased. Specifically, the number of vehicles is increasing considerably faster than the realized increase and improvements to the supporting infrastructure. Accordingly, navigations systems within vehicles and other moving objects provide a way of avoiding and/or reducing traffic congestion.

The navigation system detects a current position using navigation messages transmitted from a plurality of GPS (global positioning system) satellites and moving-object drive state detecting signals detected by a plurality of sensors provided to the corresponding moving object, such as a gyroscope, a speed sensor and the like. If a current position of the moving object is detected, the detected current position of the moving object is matched to map data. The current position of the moving object is displayed on a display unit together with a corresponding map. The navigation system provides the functionality of searching a drive path of a moving object from an origination to a destination using the map data and the functionality of guiding the drive path to enable the moving object to drive along the searched drive path.

The navigation system searches prescribed guide targets in front of the moving object, such as an intersection, an underpass, an overpass, a highway entrance/exit and the like, when the moving object is driving along the searched drive path. If the moving object approaches the searched guide target within a prescribed distance, the navigation system guides the drive path via a voice signal and the like. The navigation system determines if the moving object deviates from the searched drive path and drives along another, different path. If deviation from the drive path is determined by the navigation system, the navigation system informs a user of the deviation from the drive path to enable the user to correctly maneuver the moving object along the proper drive path. Therefore, the navigation system searches for the proper drive path of the moving object and guides the moving object along the proper drive path so that the given road system can be efficiently utilized.

The navigation system detects a current position of the moving object and determines whether a guide target is located within a set distance in front of the drive path by taking the detected current position as a reference. If the guide target is located within the set distance, the navigation system indicates a drive direction for the moving object to take from the corresponding guide target, such as indicating a left turn, using a voice signal and a drive direction icon displayed on the display unit. In guiding the drive direction of the moving object using the guide voice signal and the drive direction icon, the navigation system can accurately guide the drive direction of the moving object if the guide targets located ahead of the moving object are separated from each other by relatively large distances.

However, if the guide targets located ahead of the moving object are considerably close to each other, the typical navigation system has difficulty in determining where the guide target for guiding the drive direction is accurately located. Hence, the user may frequently deviate from the drive path by driving the moving object in the drive direction guided according to the location of an unguided target.

Figure 1A:
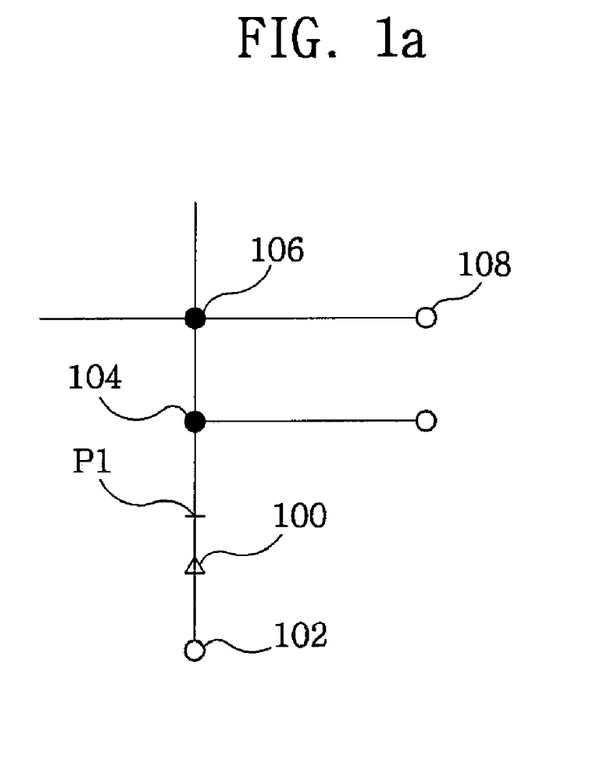
FIGS. 1a and 1b are schematic views of an operation in which a navigation system provides a drive path for a moving object.

For instance, it is assumed that a moving object 100, as shown in FIG. 1a, sequentially drives along links between nodes 102, 104 and 106, and then turns to the right at the node 106 as an intersection to drive on the link between the node 106 and a node 108. A navigation system determines whether the node 106, as a guide target of a drive path, is located within a set distance ahead of the moving object 100. In particular, the navigation system determines whether the moving object 100 has arrived at a guide point P1 to guide the drive path for the node 106 as the guide target.

Figure 1B:
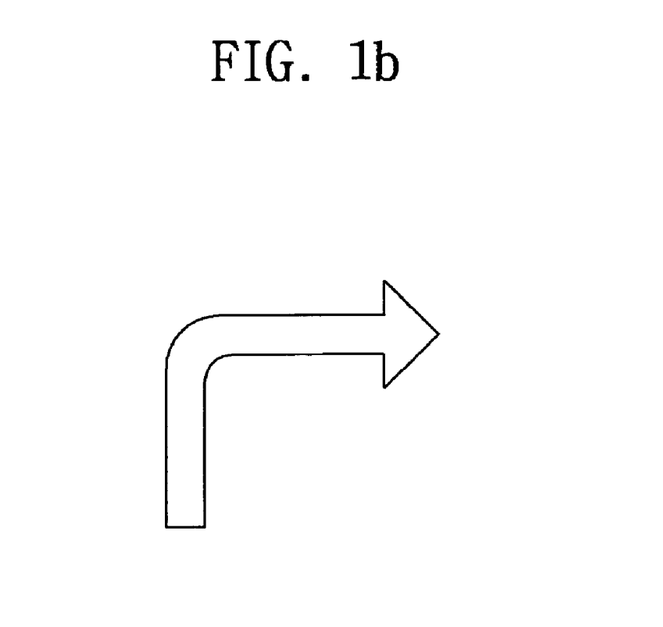

If the moving object 100 has arrived at the guide point P1, the navigation system guides a right turn at the node 106 using a voice signal. The navigation system also displays a drive direction icon for guiding the right turn, as shown in FIG. 1b, on a display unit. The user checks the drive direction icon displayed on the display unit and then turns the moving object 100 to the right at the node 106.

However, where the two nodes 104 and 106 which both support right turns in the same direction are relatively close to each other, the navigation system guides a right turn of the moving object 100 at the guide point P1 corresponding to a position behind the node 104 before the moving object 100 has arrived at the node 104 or 106. The user of the moving object 100 may be unable to correctly determine whether to make a right turn at the node 104 or at the node 106 using the guide voice signal and the drive direction icon displayed on the display unit only. Accordingly, the user of the moving object 100 fails to correctly turn the moving object 100 to the right at the node 106, but may make a right turn at the node 104 and thus deviate from the drive path.

The Korean Patent Application No. 63322 filed in 2002 (Public Laid-Open No. 2004-34009), the entire contents of which are incorporated by reference herein, describe that a bent angle of a drive direction icon is adjusted to be displayed according to an angle of each link on which a moving object drives. Therefore, a user of the moving object driving on a current link can correctly check an angle of a next link, on which the moving object is to drive after passing through an intersection, e.g., using the bent angle of the drive direction icon.

SUMMARY

Accordingly, this description is directed to a method of guiding a drive path of a moving object in a navigation system that substantially obviates one or more problems due to limitations and disadvantages of the background art.

In one general aspect, a method of guiding a motor vehicle having a navigation system along a drive path includes determining a current position of the motor vehicle with a control unit of the navigation system and providing the drive path to a display unit based on the current position of the moving object. The method includes determining whether the motor vehicle has arrived at a complex guide point of a guide target, wherein the complex guide point includes a plurality of road interchanges within a predetermined distance of each other, the road interchanges each including a road direction angle within a common angular range. Upon arrival at the complex guide point, the method determines a first turn guide icon and a second turn guide icon for the guide target, wherein the first turn guide icon and the second turn guide icon collectively represent a suggested vehicle operation at the guide point and a drive direction at a position of the guide target from a plurality of previously stored turn guide icons. The determined turn guide icons are displayed sequentially relative to the drive path throughout the vehicle operation at the guide point on a display unit.

Implementations of this aspect may include one or more of the following features.

The common angular range is approximately 15°. The guide icons each differ in directional angle by approximately 5° or more.

In another general aspect, a method of guiding a moving object having a navigation system along a path includes determining a current position of the moving object with a control unit. The method includes determining whether the moving object has arrived at a guide point of a guide target and instructing the drive path based on the current position of the moving object. Upon arrival at the guide point, a first turn guide icon and a second turn guide icon are determined for the guide target, wherein the first turn guide icon and the second turn guide icon collectively represent a suggested vehicle operation at the guide point and a drive direction at a position of the guide target from a plurality of previously stored turn guide icons. The determined turn guide icons are sequentially displayed relative to the drive path throughout the vehicle operation at the guide point on a display unit.

Implementations of this aspect may include one or more of the following features.

The current position of the moving object is determined with hybrid navigation using the control unit, wherein hybrid navigation comprises receiving a navigation message with a GPS receiver and detecting a drive state detecting signal with a sensor unit.

The detected current position of the moving object is matched to map data and the detected current position and map data are displayed on the display unit.

The path is searched between an origination and destination of the moving object, wherein the guide target is located on the searched drive path. Searching the path includes inputting a search command to a command input unit.

The origination of the moving object is a position detected by the control unit by hybrid navigation, wherein hybrid navigation comprises receiving a navigation message with a GPS receiver and detecting a drive state detecting signal with a sensor unit.

Searching the drive path includes referencing previously stored map data with the control unit, wherein the previously stored map data is in a map data storage unit.

The plurality of turn guide icons differ from one another with respect to a display angle per a preset angle interval.

Determining the turn guide icons include determining turn guide icons having display angles within a range of an angle at which the moving object should be turned from the position of the guide target.

Sequentially displaying includes determining a distance between a current position of the moving object and the position of the guide target, and sequentially displaying the turn guide icons according to the determined distance.

The distance is determined between the current position and the position of the guide target. The current position of the moving object is determined with hybrid navigation by the control unit, wherein hybrid navigation includes receiving a navigation message with a GPS receiver and detecting a drive state detecting signal with a sensor unit.

The guide point includes a complex guide point including a plurality of road interchanges within a predetermined distance of each other, the road interchanges each including a road direction angle within a common angular range.

The common angular range is 15°. The first and the second icons differ in directional angle by approximately 5° or more.

The moving object is a motor vehicle and the path is a driving path of the motor vehicle.

In another general aspect, a navigation system within a moving object for guiding the moving object along a drive path includes a satellite navigation system receiver, a sensor unit for detecting a driving direction and operating state of the moving object independently from the satellite navigation system receiver, a map data storage unit, a display unit, and a control unit.

Implementations of this aspect may include one or more of the following features.

The control unit is configured for determining whether the moving object has arrived at a guide point of a guide target for instructing the drive path based on the current position of the moving object and the driving direction and the operating state of the moving object.

The control unit is configured for determining, upon arrival at the guide point, a first turn guide icon and a second turn guide icon for the guide target, wherein the first turn guide icon and the second turn guide icon collectively represent a suggested vehicle operation at the guide point and a drive direction at a position of the guide target from a plurality of previously stored turn guide icons within the map data storage unit.

The control unit is configured for sequentially displaying the determined turn guide icons relative to the drive path throughout the vehicle operation at the guide point on the display unit.

BRIEF DESCRIPTION OF THE DRAWINGS

FIGS. 4a through 4m are exemplary diagrams of a plurality of turn guide icons for displayed on display unit of a navigation system.

DETAILED DESCRIPTION

Reference will now be made in detail to various implementations, examples of which are illustrated in the accompanying drawings. The same reference numerals are often used in the drawings to refer to the same or like parts.

Figure 2:
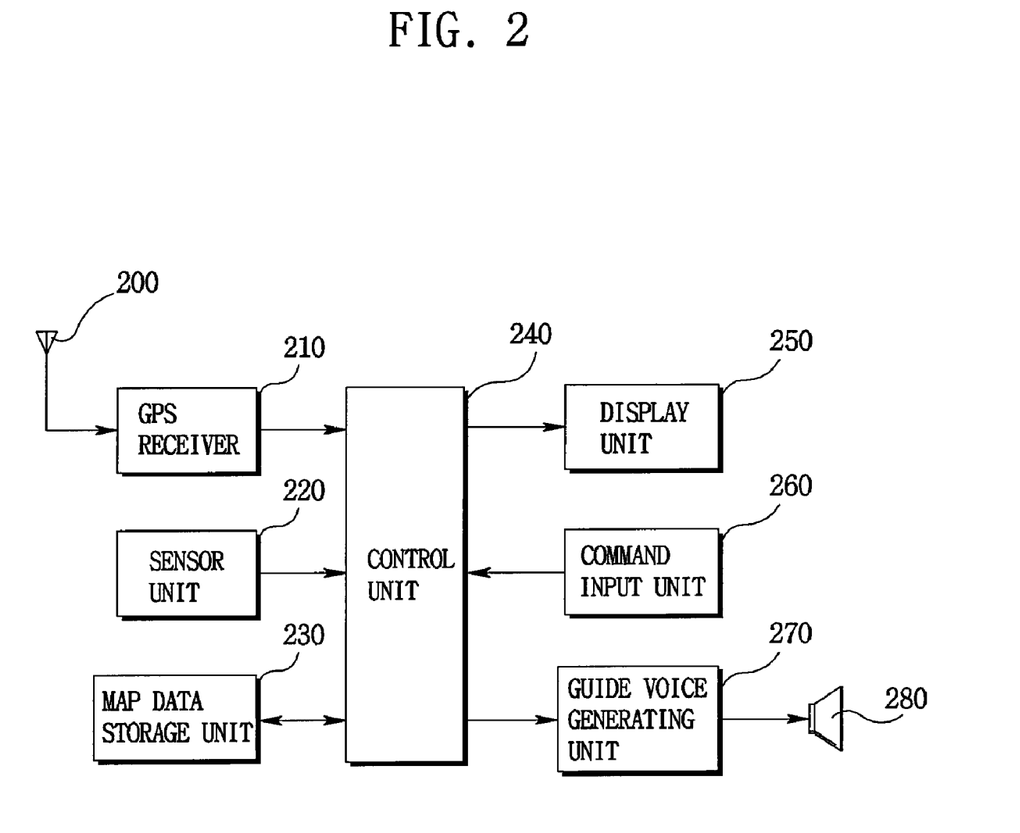
FIG. 2 is a block diagram of a navigation system for guiding a moving object along a drive path.

Referring to FIG. 2 is a block diagram of a navigation system includes a GPS receiver 210 which receives navigation messages transmitted from a plurality of GPS satellites (not shown in the drawing). The GPS receiver 210 calculates and outputs a value of DOP (dilution of precision) indicating a degree of reliability of the received navigation message. The navigation system includes a sensor unit 220 and a map data storage unit 230. The sensor unit 220 may include a gyroscope for detecting a drive angle of the moving object, and various sensors, such as a speed sensor for detecting a drive speed of the moving object and the like, to detect an operating state of the moving object and to output a drive state detecting signal. The map data storage unit 230 stores map data for searching a drive path of the moving object and for guiding the drive path.

The navigation system includes a control unit 240 for determining a current position of the moving object with hybrid navigation. The control unit 240 may be included within one or more of a central processing unit (CPU) or a computer system of the navigation system. The control unit, or other programmable logic device that provides instruction, logic, and mathematical processing in the navigation system may also be one or more of a CPU or computer system, e.g., including an arithmetic logic unit (ALU), which performs arithmetic and logical operations, and/or an individual control unit, which extracts instructions from a memory device, such as within the navigation system, and decodes and executes the instructions, e.g., calling on the ALU when necessary.

For example, the control unit 240 may be configured for operating with hybrid navigation. Hybrid navigation includes using the navigation messages received by the GPS receiver 210 and the drive state detecting signal of the moving object detected by the sensor unit 220. The control unit 240 searches the drive path from an origination to a destination using the map data stored in the map data storage unit 230. The control unit 240 controls the determined current position of the moving object, by verifying the accuracy of the current position of the moving object and/or matching the current position to the map data for displaying a determined current position of the moving object. The control unit 240 guides the moving object to drive along the searched drive path by updating the determined current position of the moving object responsive to each new set of position data received through the navigation system, e.g., through the GPS receiver 210 and sensor unit 220 with hybrid navigation. The control unit 240 also determines a display position on the map where a road, highway or other landmark should be named.

The navigation system includes a display unit 250 and a command input unit 260. The display unit 250 displays the map data, the current position of the moving object, the drive path of the moving object and the road name at the display position determined by the control unit 240. The command input unit 260 includes a plurality of function keys, generates an operation command according to user manipulation of a plurality of the function keys, and inputs the generated operation command to the control unit 240.

A guide voice generating unit 270 generates a prescribed guide voice signal to guide a drive of the moving object according to a control of the control unit 240. The guide voice generating unit 270 outputs the generated guide voice signal to a speaker 280 to inform a user of the moving object of the drive path of the moving object.

Figure 3:
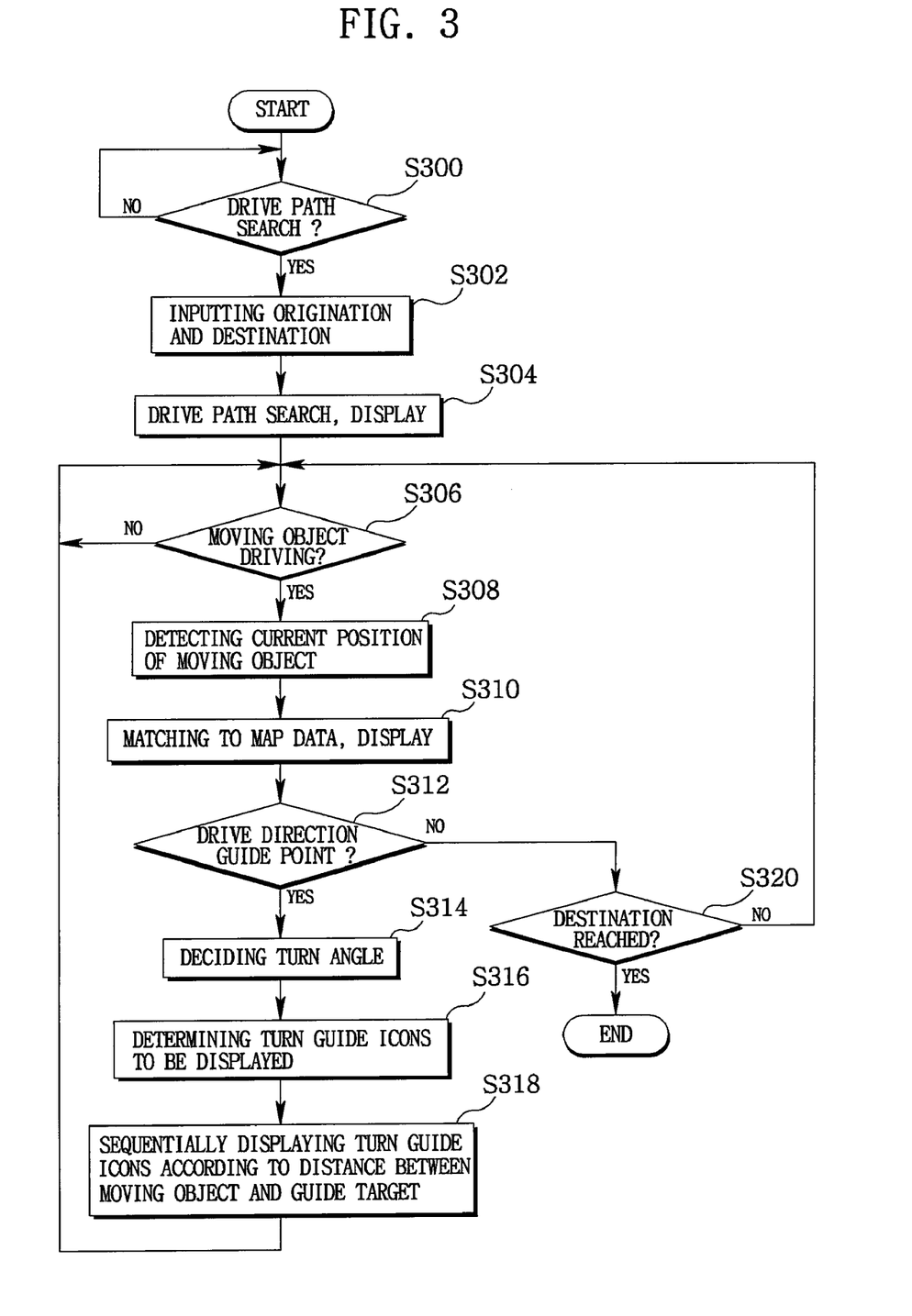
FIG. 3 is a flowchart of a method for guiding a moving object along a drive path.
Figure 4:
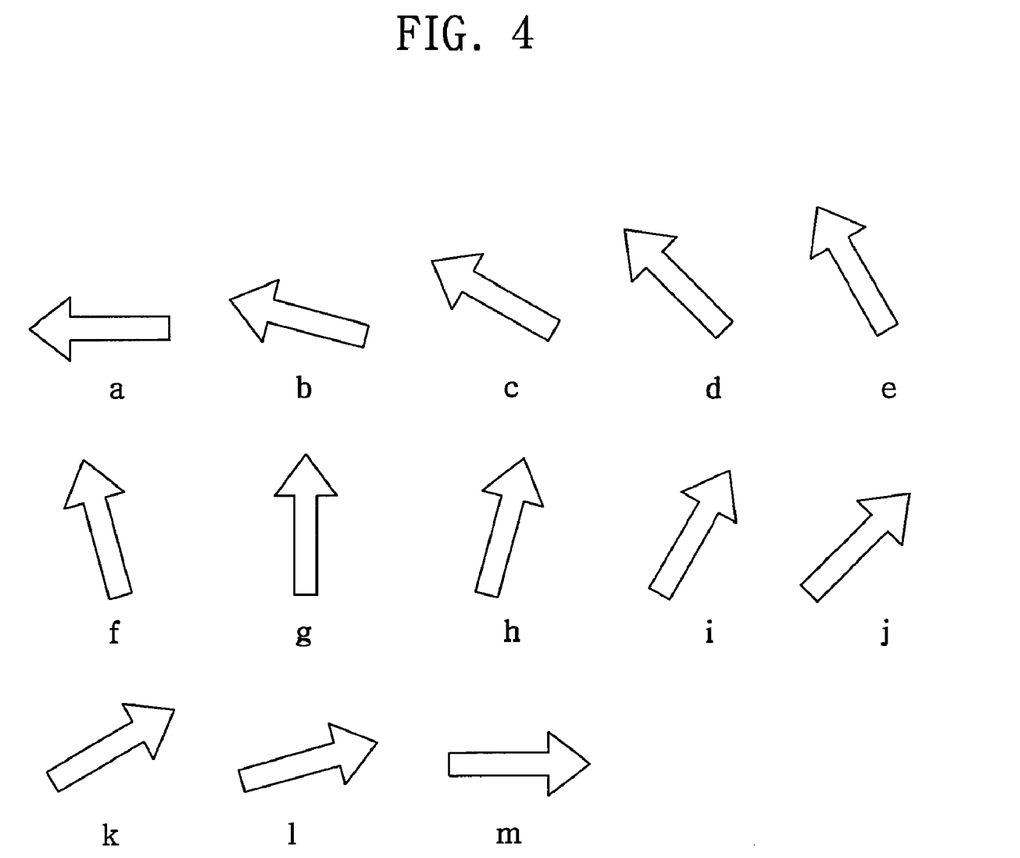

Referring to FIG. 3, the control unit 240 determines whether a search command for a drive path is inputted by a user's manipulation of the command input unit 260 (S300). If the search command for the drive path is inputted, the control unit 240 receives an origination and destination of a moving object from the command input unit 260 (S302).

In this case, the origination of the moving object can be set to a current position of the moving object determined by the control unit 240 using hybrid navigation that utilizes navigation messages received by the GPS receiver 210 and a drive state detecting signal of the moving object detected by the sensor unit 220.

In hybrid navigation, the control unit 240 receives a value of DOP calculated by the GPS receiver 210 having received the navigation messages. If the calculated value of the DOP is a reliable value, e.g., accuracy is within an acceptable range such as 20 feet or a probability of accuracy, as a result of the determination, the control unit 240 detects a current position of the moving object using the navigation messages received by the GPS receiver 210. If the value of DOP is not a reliable value, the control unit 240 detects a current position of the moving object using the drive state detecting signal of the moving object detected by the sensor unit 220 from a last position of the moving object detected using the reliable navigation message. Therefore, it is possible to set the origination of the moving object to the current position of the moving object detected by the hybrid navigation.

Once the origination and destination of the moving object are inputted, the control unit 240 searches a drive path of the moving object from the origination to the destination using map data stored in the map data storage unit 230. The control unit 240 then determines whether the moving object is driving (S306). In doing so, a determination of the drive path of the moving object can be conducted using the moving state detecting signal of the moving object detected, for example, by the sensor unit 220 of a motor vehicle.

If the moving object is determined to be driving, the control unit 240 detects the current position of the moving object by the a hybrid navigation (S308). The control unit 240 matches the detected current position of the moving object to the map data and displays it on the display unit 250 to enable a user to confirm the current position (S310).

Under this circumstance, the control unit 240 determines whether the moving object has arrived at a drive direction guide point for instructing a drive direction of the moving object using the determined current position of the moving object (S312). Namely, it is determined whether a guide target, such as an intersection or the like, is located ahead of the moving object and it is determined whether the moving object has arrived at the guide point to instruct the drive path for the guide target.

If the moving object has arrived at the guide point, the control unit 240 determines a turn angle at which the moving object will turn from the guide target (S314). Namely, the control unit 240 determines the angle of a link, on which the moving object will drive after passing through the guide target, by taking a current link on which the moving object is driving as a reference. If the guide target is a complex guide target, e.g., a first intersection that supports a right turn and a neighboring intersection that is located relatively close to the first intersection such as less than a few hundred feet, the turn angle of the moving object is updated throughout the vehicle's movement through a complex guide target.

For example, once the turn angle of the moving object is determined, the control unit 240 determines a plurality of turn guide icons to display according to the determined turn angle of the moving object (S316) during the moving object's travel through an area having a complex guide target. The control unit 240 then sequentially selects, according to a distance between the moving object and the guide target (S318), a plurality of the determined turn guide icons to display on the display unit 250. The interval of the determined turn guide icons may be predetermined for particularly confusing and known intersections and/or provided by the control unit 240 for an intersection that has not been previously designated as a complex intersection or guide target.

A plurality of turn guide icons differing in display angle from each other by a predetermined angle, such as 15°, are shown in FIGS. 4*a* through 4*m*. The turn guide icons are prepared based on the physical attributes of the road and/or prepared and stored in advance, e.g., in the map data storage unit 230.

Figure 5A:
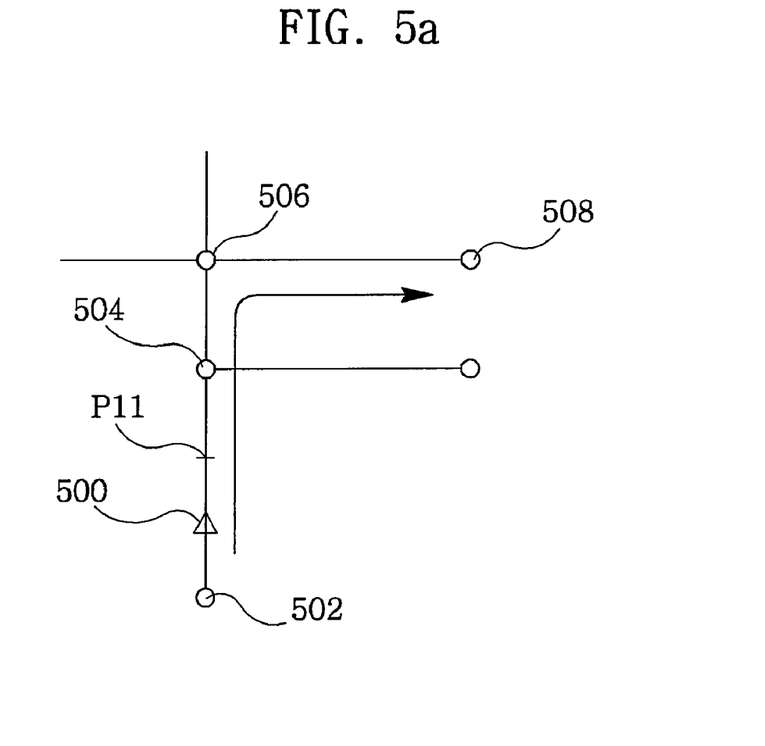
FIGS. 5a through 5c are schematic views of an operation in which a navigation system guides a moving object along a guide path.

For instance, it is assumed that a moving object 500, as shown in FIG. 5*a*, drives on a link between nodes 502, 504 and 506, turns to the right from the node 506 in a direction of 90°, and then drives on a link between the node 506 and a node 508.

If so, the control unit 240 determines whether the moving object 50 drives to arrive at a guide point P11 for instructing a turn guide. If the moving object has arrived at the guide point P11, the control unit 240 determines an angle of the link located between the nodes 506 and 508 by taking the link between the nodes 502, 504 and 506 as a reference.

Once the angle is determined, the control unit 240 determines the turn guide icons shown in FIGS. 4*a* through 4*m* from a plurality of the turn guide icons. The control unit 240 keeps determining the distance between the moving object 500 and the node 502 and sequentially selects the determined turn guide icons shown in FIGS. 4*a* through 4*m* one by one to display on the display unit 250.

Figure 5B:
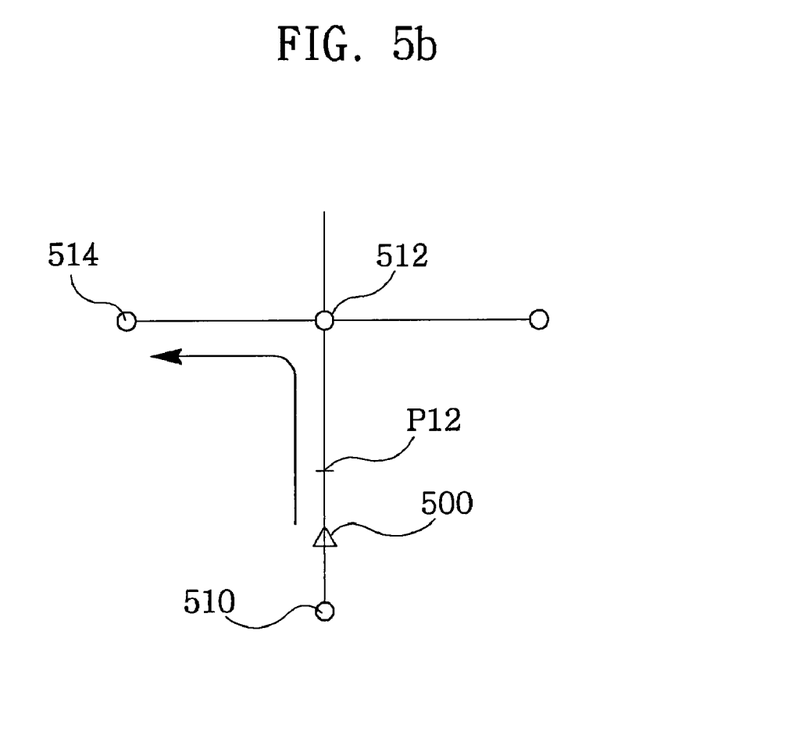

It is assumed that the moving object 500, as shown in FIG. 5*b*, drives on a link between nodes 510 and 512 to turn to the left from the node 512 in a direction of a node 514. If so, by determining an angle of a link between the nodes 512 and 514 by taking a link between the nodes 510 and 512 as a reference in case the moving object 500 has arrived at a guide target point P12 for instructing a turn guide, the control unit 240 determines a plurality of the turn guide icons such as the icons shown in FIGS. 4*a* through 4*g*. The control unit 240 then keeps determining the distance between the moving object 500 and the node 512 and sequentially selects the determined turn guide icons shown in FIGS. 4*a* through 4*g* one by one to display on the display unit 250.

Figure 5C:
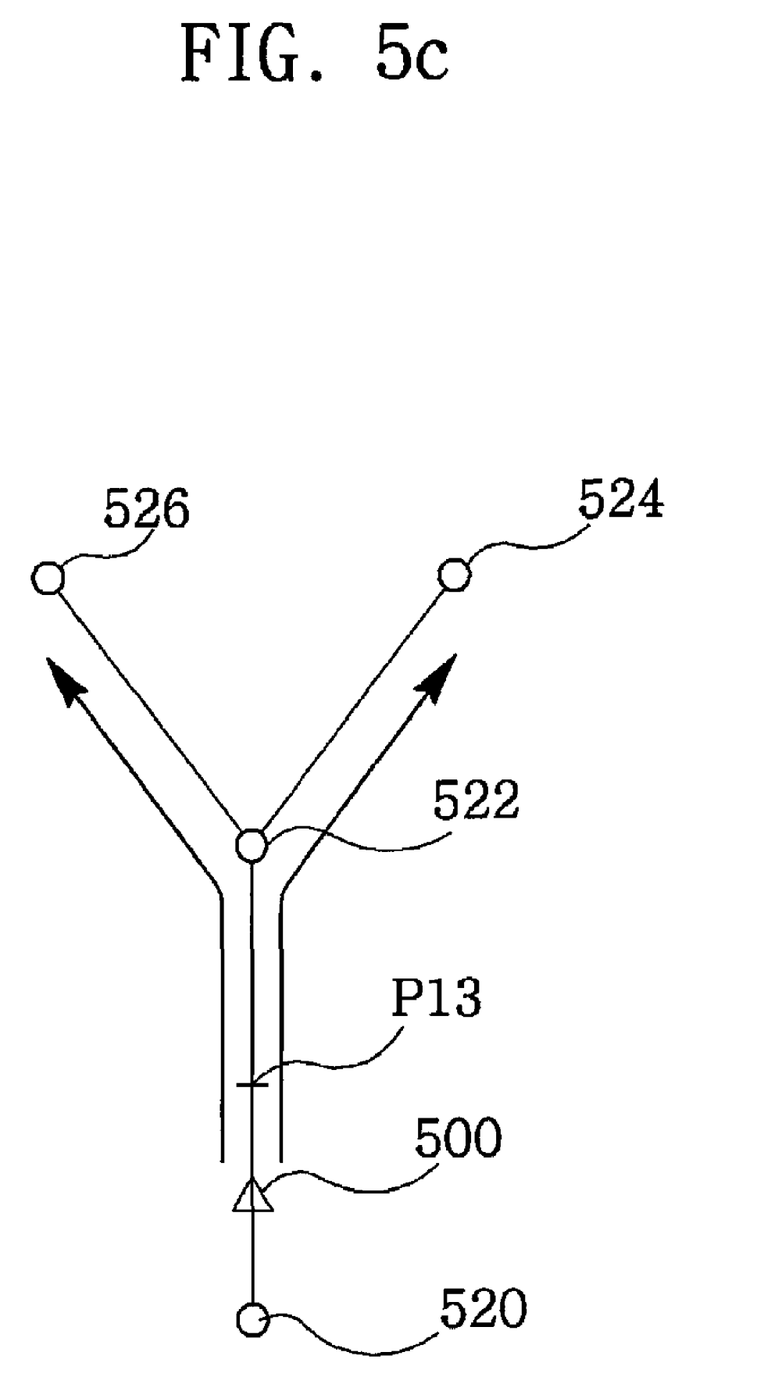

It is assumed that the moving object 500, as shown in FIG. 5*c*, drives on a link between nodes 520 and 522 to turn to the left from the node 522 at about 45°. The control unit 240 determines the turn guide icons shown in FIGS. 4*g* through 4*j* in case the moving object 500 has arrived at a guide target point P13, and then sequentially selects the determined turn guide icons shown in FIGS. 4*g* through 4*j* one by one to display on the display unit 250 according to the distance between the moving object and the node 520, such as while a motor vehicle is performing the turning operation.

It is assumed that the moving object 500, as shown in FIG. 5*c*, drives on the link between nodes 520 and 522 to turn to the right from the node 522 at about 45°. If so, the control unit 240 determines the turn guide icons shown in FIGS. 4D through 4G in case the moving object 500 has arrived at the guide target point P13 and then sequentially selects the determined turn guide icons shown in FIGS. 4D to 4G one by one and displays each of the icons incrementally on the display unit 250 according to the distance between the moving object and the node 520.

In this case, a plurality of the turn guide icons can be formed in various angles. For instance, a plurality of the turn guide icons are generated in advance, each 5° or 10° offset with respect to each other, and stored in the map data storage unit 230. If the moving object has not reached the guide point for instructing the turn guide as a result of the decision in the step S312, the control unit 240 determines whether the moving object has arrived at the destination (S320). If the moving object has not arrived at the destination, the control unit 240 goes back to the step S306 to detect a current position according to a drive of the moving object and repeats an operation of selecting the plurality of the turn guide icons to display on the display unit 250 in case the moving object has arrived at the guide point for instructing the turn in the drive path.

If the moving object has arrived at the destination, the control unit 240 ends the drive path guide operation of the moving object. As mentioned in the foregoing description, a plurality of the turn guide icons differing from one another in the display angle are generated in advance. If the moving object has arrived at the guide point of the guide target for instructing the drive direction, the turn guide icons belonging to the range of the angle at which the moving object is to turn are determined beforehand. The turning operation is reduced to a series of incrementally displayed turn guide icons as the motor vehicle maneuvers through a turning operation.

As the moving object has arrived at the guide target location, such as a complex guide target having multiple, similarly oriented or adjacent intersections or roads, the plurality of the selected turn guide icons are sequentially displayed.

Accordingly, one or more of the foregoing implementations may include one or more of the following features. A user of a moving object, such as a motor vehicle, can accurately determine when to turn the vehicle when the vehicle approaches a guide target location, such as an intersection, with the aid of a plurality of turn guide icons sequentially displayed on a display unit throughout the turning sequence. Accordingly, the user can accurately determine where or when to turn when approaching a confusing intersection presenting multiple and similar turning options, e.g., such as an intersection having more than one possible right turn, e.g., right turns offset with respect to each other by a specific angle. If a plurality of guide targets are located close to each other, the user can make a turn from an accurate location of the corresponding guide target to prevent the deviation from a drive path.

A navigation system or method may guide a drive path of a moving object by providing a turning direction and angle of a moving object at an intersection. A navigation system or method may guide a drive path of a moving object by instructing a correct direction for a moving object to drive in the event that a pair of intersections are located close to each other.

It should be understood that the above-described implementations are not limited by any of the details of the foregoing description. Accordingly, other implementations are within the scope of the following claims.

What is claimed is:

1. A method of guiding a motor vehicle having a navigation system along a drive path, the method comprising:
   determining a current position of the motor vehicle using a control unit of the navigation system and providing a drive path to a display unit of the navigation system based on the current position of the motor vehicle;
   determining whether the motor vehicle has arrived at a complex guide point of a guide target, wherein the guide target includes a plurality of road interchanges within a predetermined distance of each other;
   determining, upon arrival at the complex guide point, a turn angle for the motor vehicle based on suggested vehicle operation through the guide target;
   determining two or more turn guide icons for the determined turn angle from a plurality of previously stored turn guide icons, wherein the two or more turn guide icons collectively represent the determined turn angle, and wherein the two or more turn guide icons differ from one another; and
   sequentially displaying, on the display unit of the navigation system, the determined two or more turn guide icons relative to the drive path during the vehicle operation through the guide target.

2. The method of claim 1, wherein the plurality of road interchanges each include a road direction angle within a common angular range of approximately 15°.

3. The method of claim 1, wherein the previously stored turn guide icons each differ in directional angle by approximately 15°.

4. The method of claim 1, wherein sequentially displaying the determined two or more turn guide icons relative to the drive path during the vehicle operation through the guide target comprises sequentially displaying, at equally spaced distances, the determined two or more turn guide icons relative to the drive path during the vehicle operation through the guide target.

5. The method of claim 1, wherein the determined turn angle is 90°.

6. A method of guiding a moving object along a drive path, the method comprising:
   determining a current position of the moving object using a control unit and instructing a drive path based on the current position of the moving object;
   determining whether the moving object has arrived at a guide point of a guide target;
   determining, upon arrival at the guide point, a turn angle for the moving object based on a suggested drive path through the guide target;
   determining two or more turn guide icons for the determined turn angle from a plurality of previously stored turn guide icons, wherein the two or more turn guide icons collectively represent the determined turn angle, and wherein the two or more turn guide icons differ from one another; and
   sequentially displaying, on a display unit, the determined two or more turn guide icons relative to the drive path.

7. The method of claim 6, wherein the current position of the moving object is determined with hybrid navigation using the control unit, wherein hybrid navigation comprises receiving a navigation message with a GPS receiver and detecting a drive state detecting signal with a sensor unit.

8. The method of claim 6, further comprising:
   matching the determined current position of the moving object to map data; and
   displaying the determined current position of the moving object and the map data on the display unit.

9. The method of claim 6, further comprising searching a drive path between an origination and a destination of the moving object, wherein the guide target is located on the searched drive path.

10. The method of claim 9, wherein searching the drive path comprises inputting a search command to a command input unit.

11. The method of claim 9, wherein the origination of the moving object is a position detected by hybrid navigation using the control unit, wherein hybrid navigation comprises receiving a navigation message with a GPS receiver and detecting a drive state detecting signal with a sensor unit.

12. The method of claim 9, wherein searching the drive path comprises referencing previously stored map data using the control unit, wherein the previously stored map data is stored in a map data storage unit.

13. The method of claim 6, wherein the plurality of previously stored turn guide icons differ from one another in directional angle by a predetermined angle.

14. The method of claim 6, wherein sequentially displaying comprises:
   determining a distance between a current position of the moving object and the position of the guide target; and
   sequentially displaying the two or more turn guide icons according to the determined distance.

15. The method of claim 14, wherein determining the distance between the current position of the moving object and the position of the guide target comprises determining the current position of the moving object with hybrid navigation using the control unit, wherein hybrid navigation comprises receiving a navigation message with a GPS receiver and detecting a drive state detecting signal with a sensor unit.

16. The method of claim 6, wherein the guide target comprises a complex guide target including a plurality of road interchanges within a predetermined distance of each other.

17. The method of claim 6, wherein the previously stored turn guide icons each differ in directional angle by approximately 15°.

18. The method of claim 7, wherein sequentially displaying the determined two or more turn guide icons relative to the drive path comprises sequentially displaying, at equally spaced distances, the determined two or more turn guide icons relative to the drive path.

19. The method of claim 7, wherein the determined turn angle is 90°.

20. A navigation system within a moving object for guiding the moving object along a drive path, the system comprising:
   a satellite navigation system receiver;
   a sensor unit for detecting a driving direction and operating state of the moving object independently from the satellite navigation system receiver;
   a map data storage unit;
   a display unit; and
   a control unit, wherein the control unit is configured to:
      determine a current position of the moving object from data received from the satellite navigation system receiver;
      instruct a drive path based on the current position of the moving object and the driving direction and operating state of the moving object;
      determining determine whether the moving object has arrived at a guide point of a guide target;
      determine, upon arrival at the guide point, a turn angle for the moving object based on a suggested drive path of the moving object through the guide target;
      determine two or more turn guide icons for the determined turn angle from a plurality of previously stored turn guide icons, wherein the two or more turn guide icons collectively represent the determined turn angle, and wherein the two or more turn guide icons differ from one another; and
      sequentially display, on the display unit, the determined two or more turn guide icons relative to the drive path during the vehicle operation through the guide target.

21. The navigation system of claim 20, wherein the guide target is a complex guide target including a plurality of road interchanges within a predetermined distance of each other.

22. The navigation system of claim 20, wherein the control unit is further configured to determine whether the data received from the satellite navigation system receiver is reliable.

23. The navigation system of claim 22, wherein, based on a determination that the data received from the satellite navigation system receiver is not reliable, the control unit is further configured to determine the current position of the moving object from data received from the sensor unit.

24. The navigation system of claim 20, wherein the control unit is further configured to sequentially display, at equally spaced distances, the determined two or more turn guide icons relative to the drive path during the vehicle operation through the guide target.

25. The navigation system of claim 20, wherein the previously stored turn guide icons each differ in directional angle by approximately 15°.

26. The navigation system of claim 20, wherein the determined turn angle is 90°.

* * * * *